US012700307B2

(12) United States Patent
Singh et al.

(10) Patent No.: US 12,700,307 B2
(45) Date of Patent: Aug. 4, 2026

(54) METHOD FOR DISTRACTED DRIVER DETECTION AND ALERT

(71) Applicant: Karma Automotive LLC, Irvine, CA (US)

(72) Inventors: Satyam Singh, Irvine, CA (US); Sina Hamzehlouia, Irvine, CA (US)

(73) Assignee: Karma Automotive, Inc., Irvine, CA (US)

( * ) Notice: Subject to any disclaimer, the term of this patent is extended or adjusted under 35 U.S.C. 154(b) by 75 days.

(21) Appl. No.: 18/749,411

(22) Filed: Jun. 20, 2024

(65) Prior Publication Data

US 2025/0014466 A1 Jan. 9, 2025

Related U.S. Application Data

(60) Provisional application No. 63/512,022, filed on Jul. 5, 2023.

(51) Int. Cl.
*G08G 1/0962* (2006.01)
*G08G 1/01* (2006.01)
*G08G 1/052* (2006.01)

(52) U.S. Cl.
CPC ....... *G08G 1/09626* (2013.01); *G08G 1/0145* (2013.01); *G08G 1/052* (2013.01)

(58) Field of Classification Search
CPC ... G08G 1/09626; G08G 1/0145; G08G 1/052
See application file for complete search history.

(56) References Cited

U.S. PATENT DOCUMENTS

2011/0060496 A1* 3/2011 Nielsen .............. G06Q 10/0631 701/1
2017/0217421 A1 8/2017 Theodosis et al.
2018/0012092 A1* 1/2018 Gleeson-May ........ G06V 10/95
2018/0065553 A1 3/2018 Badger, II
2018/0101736 A1* 4/2018 Han .......................... B60R 1/24
2018/0144636 A1* 5/2018 Becker .............. B60W 30/0956
2018/0326850 A1* 11/2018 Recktenwald ......... B60K 35/22
(Continued)

OTHER PUBLICATIONS

Bunn et al. "Accident Analysis and Prevention", 126, 3-9, vol. 126. https://doi.org/10.1016/j.aap.2017.11.022. (May 2019).
(Continued)

*Primary Examiner* — Hussein Elchanti
(74) *Attorney, Agent, or Firm* — Honigman LLP; Thomas J. Appledorn; Grant Griffith

(57) ABSTRACT

A method for distracted driver detection and alert includes receiving vehicle speed data from one or more wheel speed sensors disposed on the vehicle and receiving proximity data from one or more proximity sensors disposed on the vehicle, the proximity data indicating a distance of the vehicle relative to any objects in front of the vehicle. The method also includes executing a distracted driver detection algorithm that uses the vehicle speed data and the proximity data to determine the vehicle is disrupting a flow of stop and go traffic and a driver of the vehicle is distracted from operating the vehicle. The method includes, based on determining that both the vehicle is disrupting the flow of stop and go traffic and the driver of the vehicle is distracted, instructing a system of the vehicle to output an alert to reengage the driver.

25 Claims, 5 Drawing Sheets

(56) References Cited

U.S. PATENT DOCUMENTS

| | | | | |
|---|---|---|---|---|
| 2018/0365533 | A1* | 12/2018 | Sathyanarayana ....... | G06N 3/09 |
| 2022/0262246 | A1* | 8/2022 | Miranda .................. | B60Q 9/00 |
| 2022/0371660 | A1* | 11/2022 | Yasuda ................ | B62D 15/025 |
| 2023/0037467 | A1 | 2/2023 | Yamamoto et al. | |
| 2024/0246552 | A1* | 7/2024 | Elkins ...................... | A61B 5/18 |

OTHER PUBLICATIONS

Nemcova et al. "Multimodal Features for Detection of Driver Stress and Fatigue: Review" vol. 22, Issue: 6, p. 3214-3233. Mar. 10, 2020. IEEE Transactions on Intelligent Transportation Systems. Institute of Electrical and Electronics Engineers Inc. DOI: 10.1109/TITS.2020.2977762.
Tran et al. "Real-time Detection of Distracted Driving based on Deep Learning" IET Intelligent Transport Systems, 12(10), 1210-1219. DOI: 10.1049/iet-its.2018.5172. Dated Jul. 2018.
Koo et al. "Understanding driver responses to voice alerts of autonomous car operations" 70(4), 377-392. DOI: 10.1504/IJVD.2016.076740. Dated: Jan. 2016.
Maltz et al. "Imperfect in-vehicle collision avoidance warning systems can aid drivers.". Human Factors, vol. 46, Issue 2, 357-366. https://doi.org/10.1518/hfes.46.2.357.37348. Dated: Jun. 1, 2004.
International Search Report and Written Opinion (EPO) for Application No. PCT/US2024/033729 dated Oct. 18, 2024.

* cited by examiner

METHOD FOR DISTRACTED DRIVER DETECTION AND ALERT

CROSS-REFERENCE TO RELATED APPLICATIONS

This U.S. patent application claims priority under 35 U.S.C. § 119(e) to U.S. Provisional Application 63/512,022, filed on Jul. 5, 2023. The disclosure of this prior application is considered part of the disclosure of this application and is hereby incorporated by reference in its entirety.

TECHNICAL FIELD

This disclosure relates to a method for distracted driver detection and alert

BACKGROUND

Distracted driving constitutes any activity that diverts a driver's attention away from the road such as using wireless devices, interacting with a vehicle's infotainment system, talking to passengers, etc. A distracted driver disrupts the flow of traffic, increases travel time for fellow drivers, compromises road safety, and could contribute to instances of road rage. Drivers are most likely to be distracted when stopped at a red light and/or stuck in traffic. In these scenarios, the distracted driver may not react appropriately to the flow of traffic (e.g., the driver does not begin driving when a traffic signal changes from red to green) which may cause additional congestion and/or result in collisions as other drivers attempt to circumvent the distracted driver.

SUMMARY

One aspect of the disclosure provides a computer-implemented method for distracted driver detection and alert during stop and go traffic in a vehicle that may include a conventional internal combustion engine vehicle, a hybrid electric vehicle, a fuel cell vehicle, and/or a battery electric vehicle that incorporates a front proximity sensor. The computer-implemented method executed on data processing hardware that causes the data processing hardware to perform operations including, during the operation of the vehicle, receiving vehicle speed data from one or more wheel speed sensors disposed on the vehicle and receiving proximity data from one or more proximity sensors disposed on the vehicle, the proximity data indicating a distance of the vehicle relative to any objects in front of the vehicle. The operations include executing a distracted driver detection algorithm that uses the vehicle speed data and the proximity data to determine whether the vehicle is disrupting a flow of stop and go traffic. The operations also including executing the distracted driver detection algorithm that uses the vehicle speed data and the proximity data to determine whether a driver of the vehicle is distracted from operating the vehicle. The operations include based on determining that both the vehicle is disrupting the flow of stop and go traffic and the driver of the vehicle is distracted, instructing a system of the vehicle to output an alert to reengage the driver.

Implementations of the disclosure may include one or more of the following optional features. In some implementations, executing the distracted driver detection algorithm determines that both the vehicle is disrupting the flow of stop and go traffic and the driver of the vehicle is distracted without using any data obtained from driver monitoring equipment and without using any data obtained from advanced driver-assistance systems (ADAS) equipment. Further, instructing the system of the vehicle to output the alert to reengage the driver may include instructing an infotainment system of the vehicle to audibly output an audible alert from an acoustic speaker of the vehicle, the acoustic speaker in communication with the data processing hardware. Alternatively, instructing the system of the vehicle to output the alert to reengage the driver may include instructing an infotainment system of the vehicle to visually output a graphical alert on a display screen of the vehicle, the display screen in communication with the data processing hardware. In some implementations, instructing the system of the vehicle to output the alert to reengage the driver includes instructing one or more interior components of the vehicle to output a haptic alert.

In some implementations, executing the distracted driver detection algorithm includes determining the vehicle is disrupting the flow of stop and go traffic based on the vehicle speed data indicating that a speed of the vehicle is less than a threshold speed. Executing the distracted driver detection algorithm in these implementations further includes determining the driver of the vehicle is distracted from operating the vehicle based on the proximity data indicating that the distance of the vehicle relative to a second vehicle in front of the vehicle is greater than a threshold distance or a rate of change of the distance of the vehicle relative to the second vehicle in front of the vehicle is greater than a threshold rate of change.

In some implementations, the operations further include receiving drive state data indicating that a drive gear of the vehicle is actuated. In these implementations, executing the distracted driver detection algorithm to determine that both the vehicle is disrupting the flow of stop and go traffic and the driver of the vehicle is distracted is further based on the drive state data indicating that the drive gear of the vehicle is actuated.

In other implementations, the operations include receiving parking brake state data indicating that a parking brake of the vehicle is released. In these implementations, executing the distracted driver detection algorithm to determine that both the vehicle is disrupting the flow of stop and go traffic and the driver of the vehicle is distracted is further based on the parking brake state data indicating that the parking brake of the vehicle is released.

In still other implementations, the operations include receiving a hazard light state indication indicating that hazard lights of the vehicle are off. In these implementations, executing the distracted driver detection algorithm to determine that both the vehicle is disrupting the flow of stop and go traffic and the driver of the vehicle is distracted is further based on the hazard light state indication indicating that hazard lights of the vehicle are off.

In some implementations, the operations include receiving a power mode indication indicating that a power mode of the vehicle includes a propulsion mode. In these implementations, executing the distracted driver detection algorithm to determine that both the vehicle is disrupting the flow of stop and go traffic and the driver of the vehicle is distracted is further based on the power mode indication indicating that the power mode of the vehicle includes the propulsion mode.

The vehicle may include any of a battery electric vehicle, a hybrid electric vehicle, or an internal combustion engine. In some implementations, the data processing hardware resides on the vehicle.

Another aspect of the disclosure provides a system for distracted driver detection and alert during stop and go traffic in a vehicle that may include a conventional internal combustion engine vehicle, a hybrid electric vehicle, a fuel cell vehicle, and/or a battery electric vehicle that incorporates a front proximity sensor. The system includes data processing hardware and memory hardware in communication with the data processing hardware. The memory hardware stores instructions that when executed on the data processing hardware cause the data processing hardware to perform operations. The operations include during the operation of the vehicle, receiving vehicle speed data from one or more wheel speed sensors disposed on the vehicle and receiving proximity data from one or more proximity sensors disposed on the vehicle, the proximity data indicating a distance of the vehicle relative to any objects in front of the vehicle. The operations include executing a distracted driver detection algorithm that uses the vehicle speed data and the proximity data to determine whether the vehicle is disrupting a flow of stop and go traffic. The operations also including executing the distracted driver detection algorithm that uses the vehicle speed data and the proximity data to determine whether a driver of the vehicle is distracted from operating the vehicle. The operations include based on determining that both the vehicle is disrupting the flow of stop and go traffic and the driver of the vehicle is distracted, instructing a system of the vehicle to output an alert to reengage the driver.

This aspect may include one or more of the following optional features. Implementations of the disclosure may include one or more of the following optional features. In some implementations, executing the distracted driver detection algorithm determines that both the vehicle is disrupting the flow of stop and go traffic and the driver of the vehicle is distracted without using any data obtained from driver monitoring equipment and without using any data obtained from advanced driver-assistance systems (ADAS) equipment. Further, instructing the system of the vehicle to output the alert to reengage the driver may include instructing an infotainment system of the vehicle to audibly output an audible alert from an acoustic speaker of the vehicle, the acoustic speaker in communication with the data processing hardware. Alternatively, instructing the system of the vehicle to output the alert to reengage the driver may include instructing an infotainment system of the vehicle to visually output a graphical alert on a display screen of the vehicle, the display screen in communication with the data processing hardware. In some implementations, instructing the system of the vehicle to output the alert to reengage the driver includes instructing one or more interior components of the vehicle to output a haptic alert.

In some implementations, executing the distracted driver detection algorithm includes determining the vehicle is disrupting the flow of stop and go traffic based on the vehicle speed data indicating that a speed of the vehicle is less than a threshold speed. Executing the distracted driver detection algorithm in these implementations further includes determining the driver of the vehicle is distracted from operating the vehicle based on the proximity data indicating that the distance of the vehicle relative to a second vehicle in front of the vehicle is greater than a threshold distance or a rate of change of the distance of the vehicle relative to the second vehicle in front of the vehicle is greater than a threshold rate of change.

In some implementations, the operations further include receiving drive state data indicating that a drive gear of the vehicle is actuated. In these implementations, executing the distracted driver detection algorithm to determine that both the vehicle is disrupting the flow of stop and go traffic and the driver of the vehicle is distracted is further based on the drive state data indicating that the drive gear of the vehicle is actuated.

In other implementations, the operations include receiving parking brake state data indicating that a parking brake of the vehicle is released. In these implementations, executing the distracted driver detection algorithm to determine that both the vehicle is disrupting the flow of stop and go traffic and the driver of the vehicle is distracted is further based on the parking brake state data indicating that the parking brake of the vehicle is released.

In still other implementations, the operations include receiving a hazard light state indication indicating that hazard lights of the vehicle are off. In these implementations, executing the distracted driver detection algorithm to determine that both the vehicle is disrupting the flow of stop and go traffic and the driver of the vehicle is distracted is further based on the hazard light state indication indicating that hazard lights of the vehicle are off.

In some implementations, the operations include receiving a power mode indication indicating that a power mode of the vehicle includes a propulsion mode. In these implementations, executing the distracted driver detection algorithm to determine that both the vehicle is disrupting the flow of stop and go traffic and the driver of the vehicle is distracted is further based on the power mode indication indicating that the power mode of the vehicle includes the propulsion mode.

The vehicle may include any of a battery electric vehicle, a hybrid electric vehicle, or an internal combustion engine. In some implementations, the data processing hardware resides on the vehicle.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Drivers are becoming increasingly distracted with the rise of smartphones and complex infotainment systems. Distracted driving is problematic as it contributes to longer traffic times, compromises road safety, and is a major cause of collisions. One way to prevent distracted driving is by detecting and alerting a distracted driver through visual, audible, or haptic feedback. Current distracted driver detection systems incorporate complex Advanced Driver Assistance Systems (ADAS) equipment (e.g., camera modules, Radar, Lidar) integrated with object detection, traffic sign detection, and driver monitoring algorithms. Such equipment is generally expensive and requires sophisticated software for accurate operation, making the equipment less suitable for aftermarket integration into existing vehicles. The complexity and cost of the components used by current distracted driver detection systems make these systems less accessible.

Implementations herein are directed to a distracted driver detection system and method for detecting a distracted driver and providing alerts during stop and go traffic. In particular, the distracted driver detection system of the current disclosure monitors a state of a vehicle during operation to detect a distracted driver disrupting a flow of traffic based on an arbitration of vehicle data. The vehicle data of the vehicle includes any data collected by sensors of the vehicle that can be used to determine if a driver is distracted, such as proximity data, speed data, gear data, power data, control data, etc. The distracted driver detection system of the current disclosure relies on conventional sensors that are available in most vehicles (e.g., wheel speed sensors and/or proximity sensors) without implementing complex and expensive ADAS equipment. By utilizing components and equipment that are already included in most vehicles, the distracted driver detection system of the current disclosure is more accessible than known systems and more easily integrated into most vehicles (i.e., no additional hardware is necessary).

Figure 1:
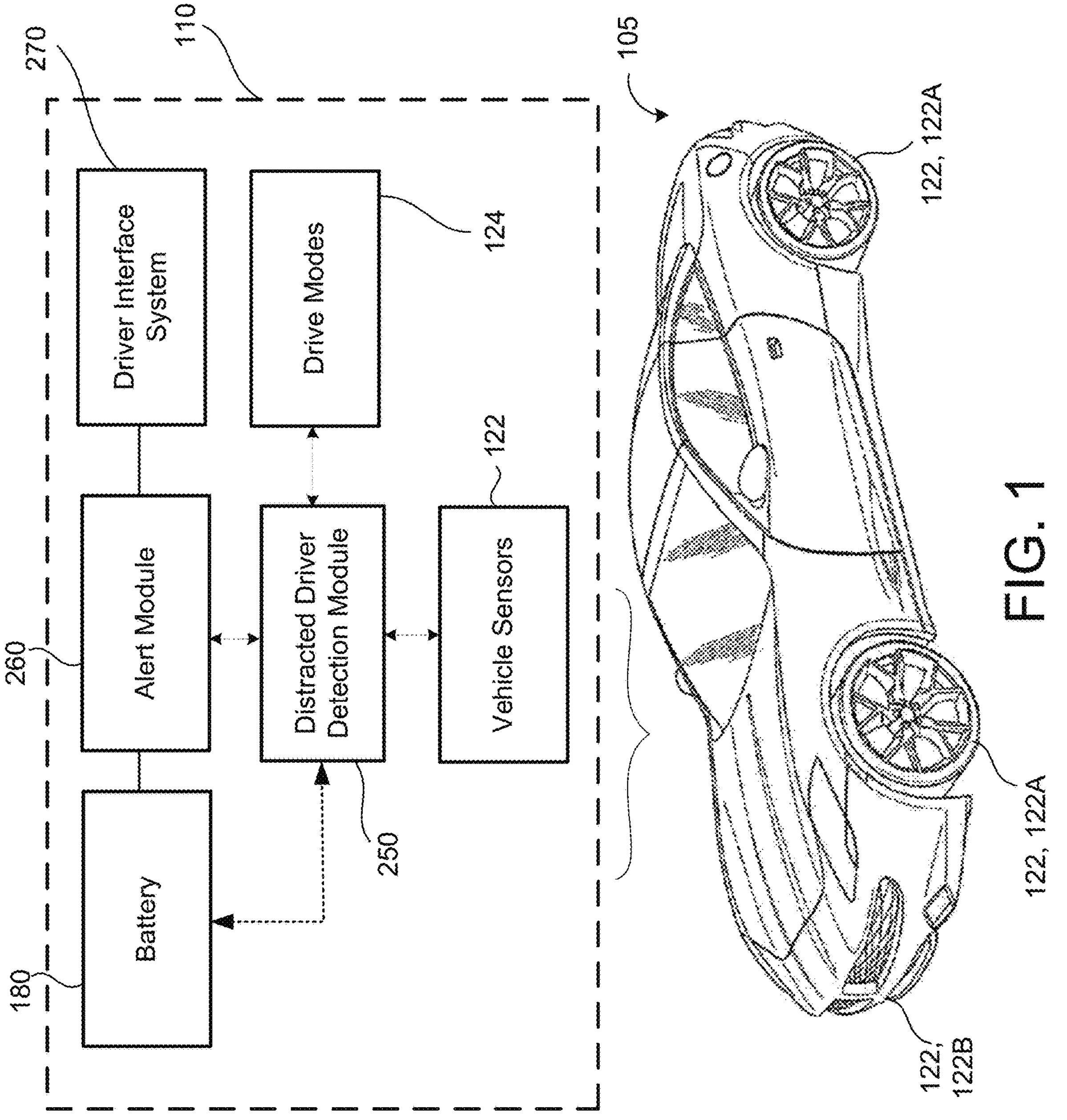
FIG. 1 is a schematic view of an example system deployed within a vehicle for distracted driver detection and alert.

Referring to FIG. 1, a vehicle 105 (e.g., a battery-powered electric vehicle, a plug-in hybrid vehicle, a hybrid electric vehicle, or an internal combustion engine vehicle) includes a distracted driver detection and alert system 110. The distracted driver detection and alert system 100 includes a distracted driver detection module 250 coupled to one or more vehicle sensors 122 and a drive mode 124 of the vehicle 105 to collect vehicle data of the vehicle 105 that can be used to detect a distracted driver. In some implementations, the distracted driver detection module 250 implements one or more algorithms (see FIG. 3) to determine if the driver of the vehicle 105 is distracted based on the vehicle data. In particular, the distracted driver detection module 250 may determine whether the vehicle 105 is disrupting a flow of stop and go traffic and/or whether the driver of the vehicle 105 is distracted from operating the vehicle 105. In some implementations, the distracted driver detection module 250 determines that the driver is distracted when both the vehicle 105 is disrupting the flow of stop and go traffic and the driver of the vehicle 105 is distracted from operating the vehicle 105. Upon detecting a distracted driver, the distracted driver detection module 250 is configured, via an alert module 260, to output one or more alerts to a driver of the vehicle 105 through a driver interface system 270. The driver interface system 270 may include any component of the vehicle 105 that can be used to alert the driver through audio, visual, and/or haptic signals. For example, the driver interface system 270 includes speakers, infotainment systems (i.e., a graphical user interface), screens, and haptic interior components (seats, a steering wheel, armrests, etc.).

A battery or energy storage device (ESD) 180 of the vehicle 105 supplies the electric power for operating the distracted driver detection and alert system 100. In some examples, the vehicle 105 includes an electrically powered or battery powered vehicle and the ESD 180 electrically powers multiple systems of the vehicle 105, such as a drive system and the distracted driver detection and alert system 100 of the vehicle 105. Optionally, the ESD 180 includes an auxiliary battery or a dedicated battery for powering only the distracted driver detection and alert system 100.

The distracted driver detection module 250 executes on data processing hardware 510 (FIG. 5) based on instructions stored n memory hardware 520 (FIG. 5) in communication with the data processing hardware 510. The memory hardware 520 stores instructions that, when executed on the data processing hardware 510, cause the data processing hardware 510 to execute the distracted driver detection module 250 to perform operations. For example, the distracted driver detection module 250 stores instructions for operating the distracted driver detection and alert system 100 based on vehicle data collected from the vehicle sensors 122 and drive modes 124. As discussed below, the distracted driver detection module 250 receives inputs from the one or more sensors 122 and a drive mode selector 124 constantly throughout operation of the vehicle 105 to detect if the driver of the vehicle 105 is distracted and to generate, via alert module 260, an alert at the driver interface system 270.

The one or more vehicle sensors 122 may be deployed throughout the vehicle 105. For example, one or more proximity sensors 122, 122B are deployed in the front of the vehicle 105 and one or more wheel speed sensors 112, 122A are deployed at the wheels of the vehicle 105. Further, any other sensors 122 that can be deployed in a vehicle 105 to collect vehicle data indicative of the operation of the vehicle 105 can be used by the distracted driver detection module 250. Other example sensors 122 include GPS, body controller, powertrain domain controller, electronic parking brake, odometer, accelerometer, light sensors, power mode sensors, hazard light state, etc. The drive modes 124 may include any data related to the actuated gear of the vehicle (e.g., park, reverse, neutral, drive). The distracted driver detection and alert system 100 may be configured to detect the distracted driver without using any data obtained from driver monitoring equipment and without using any data obtained from Advanced Driver-Assistance Systems (ADAS) equipment.

The alert module 260 is electrically coupled to the ESD 180 and the driver interface system 270 to control one or more alerts at the driver interface system 270 based on signals from the distracted driver detection module 250. The distracted driver detection module 250 and the alert module 260 are configured to cause one or more alerts at the driver interface system 270 of the distracted driver detection and alert system 100. For example, the distracted driver detection module 250 determines, based on vehicle data from the one or more vehicle sensors 122, that the driver of the vehicle is distracted. In this example, the distracted driver detection module 250 transmits a signal (e.g., distracted driver state 251 of FIG. 2) to the alert module 260 that the driver is distracted. Here, the alert module 260, based on the signal, activates one or more components of the driver interface system 270 to alert the driver of the vehicle 105 that they are exhibiting unsafe driving behavior, as discussed in greater detail below at FIG. 2.

Figure 2:
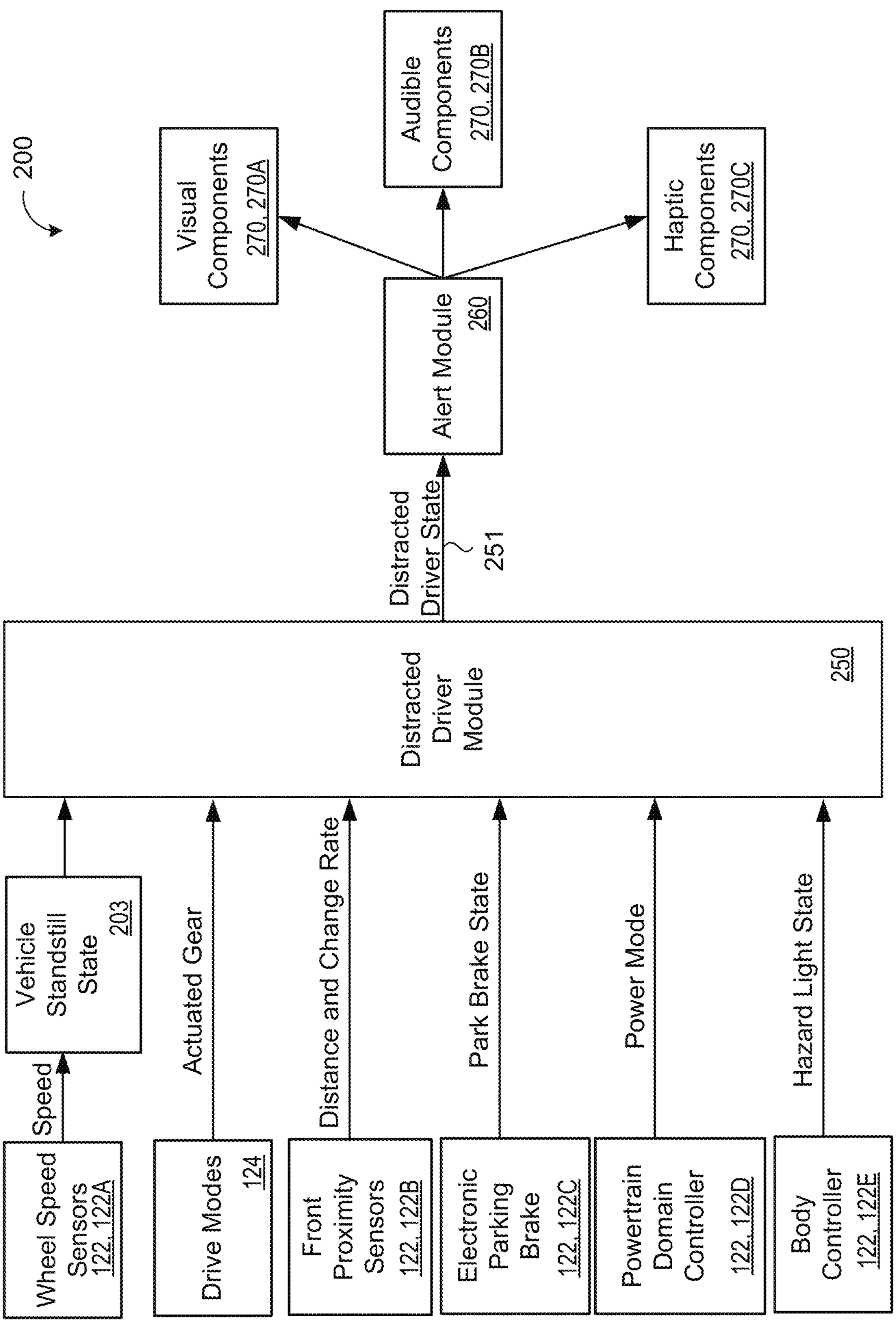
FIG. 2 is a schematic view of the distracted driver detection and alert system.

FIG. 2 illustrates a schematic view 200 of the distracted driver detection and alert system. In particular, the schematic view 200 of FIG. 2 illustrates obtaining vehicle data at various sensors 122, 122A-E, determining, via the distracted driver detection module 250, a distracted driver state 251, and outputting an alert to the driver, via alert module 260, with one or more components of the driver interface system 270, including a visual component 270, 270A, an audible component 270, 270B, or a haptic component 270, 270C. The distracted driver detection and alert system may be configured to work in "stop and go" scenarios where the vehicle 105 is constantly accelerating and/or decelerating.

The wheel speed sensors 122, 122A can include any sensors that can measure the speed of the vehicle 105. For example, the wheel speed sensors 122A may be a speedometer, an odometer, an accelerometer, etc. In some implementations, the wheel speed sensors 122A are deployed at or near the wheels of the vehicle 105 and measure the speed of the vehicle 105 based on the rotations of the wheels. In some implementations, when the vehicle 105 is not moving, the vehicle 105 may be in a vehicle standstill state 203. In other words, the vehicle 105, may be determined to have a speed of zero or near zero.

The drive modes 124 of the vehicle may refer to the actuated gear state and/or the drive state data indicating which drive gear of the vehicle 105 is actuated. For example, the drive mode 124 may indicate that the vehicle 105 is in park, reverse, neutral, drive, or low gear.

The front proximity sensors 122, 122B may be used to determine proximity data indicating a distance between the vehicle 105 and any objects (e.g., other vehicles) ahead of the vehicle 105. Further, the front proximity sensors 122B can be used to determine the change of distance over time between the vehicle 105 and any objects ahead of the vehicle 105. For example, when the distance between the vehicle 105 and the object ahead of the vehicle 105 is constantly increasing and decreasing in measure, the distracted driver detection module 250 is more likely to determine that the driver is distracted (i.e., that the distracted driver state 251 is true). Alternatively, when the distance between the vehicle 105 and the object ahead of the vehicle 105 is relatively constant in measure, the distracted driver detection module 250 is more likely to determine that the driver is not distracted (i.e., that the distracted driver state 251 is false). The front proximity sensor 122B may include any known sensor for measuring distance.

The electronic parking brake 122, 122C provides the parking brake state data indicating the position of the parking brake of the vehicle 105. The distracted driver detection module 250 may determine that the driver is distracted when the parking brake of the vehicle 105 is activated and the distance between the vehicle 105 and an object ahead of the vehicle 105 is increasing. Alternatively, distracted driver detection module 250 may determine that the driver is less likely to be distracted when the parking brake of the vehicle 105 is released.

The powertrain domain controller 122, 122D may indicate a power mode of the vehicle. In particular, the powertrain domain controller 122D may indicate whether the vehicle 105 is or is not in propulsion mode. Further, the powertrain domain controller 122D may indicate any other known or applicable power mode of the vehicle 105.

The body controller 122, 122E of the vehicle 105 may provide a hazard light state indication indicating the state of the hazard lights of the vehicle 105. In some implementations, the body controller 122E provides an indication of any other lights of the vehicle such as the brake lights, high beams, fog lights, interior lights, headlights, etc.

The distracted driver detection module 250 may obtain and/or receive data from the sensors 122A-E and 124. In some implementations, the distracted driver detection module 250 constantly obtains vehicle data from the sensors 122A-E and 124 throughout operation of the vehicle 105 to determine whether the driver of the vehicle is distracted. In other implementations, the distracted driver detection module 250 is only activated when the vehicle 105 accelerates and/or decelerates a threshold number of times within a time period (i.e., indicating that the vehicle 105 is in stop and go traffic). In some implementations, the distracted driver detection module 250 implements an algorithm (300 of FIG. 3) to determine a distracted driver state 251. The distracted driver state 251 may be a Boolean variable, a probability distribution function, a logit, or some other representation that may be used to represent the state of the driver. The distracted driver detection module 250 may transmit the distracted driver state 251 to the alert module 260.

Based on the distracted driver state 251, the alert module 260 may cause one or more components 270A-C of the driver interface system 270 to alert the driver of the vehicle 105. For example, the alert module 260 causes the visual component 270A to display a graphical alert on a display screen of the vehicle 105 indicating that the driver is distracted. In another example, the alert module 260 causes the audible component 270B to audibly output an audible alert from an acoustic speaker of the vehicle 105 indicating that the driver is distracted. In yet another example, the alert module 260 causes the haptic component 270C to output a haptic alert by an interior component of the vehicle 105 indicating that the driver is distracted.

The examples described above with respect to FIG. 2 are not intended to be limiting. The vehicle 105 may be equipped with any applicable vehicle sensors 122 and drive modes 124 to obtain vehicle data during the operation of the vehicle 105 that can be used by the distracted driver detection module 250 to determine if the driver is distracted. In some implementations, the distracted driver detection module 250 is configured to obtain any vehicle data except for vehicle data obtained from driver monitoring equipment and without using any data obtained from advanced driver-assistance systems (ADAS) equipment. Further, the distracted driver detection module 250, via the alert module 260, can cause an acceptable alert through the driver interface system 270. The alerts can include any visual, audio, or haptic alerts that can be conveyed through any applicable interface components of the vehicle 105.

Figure 3:
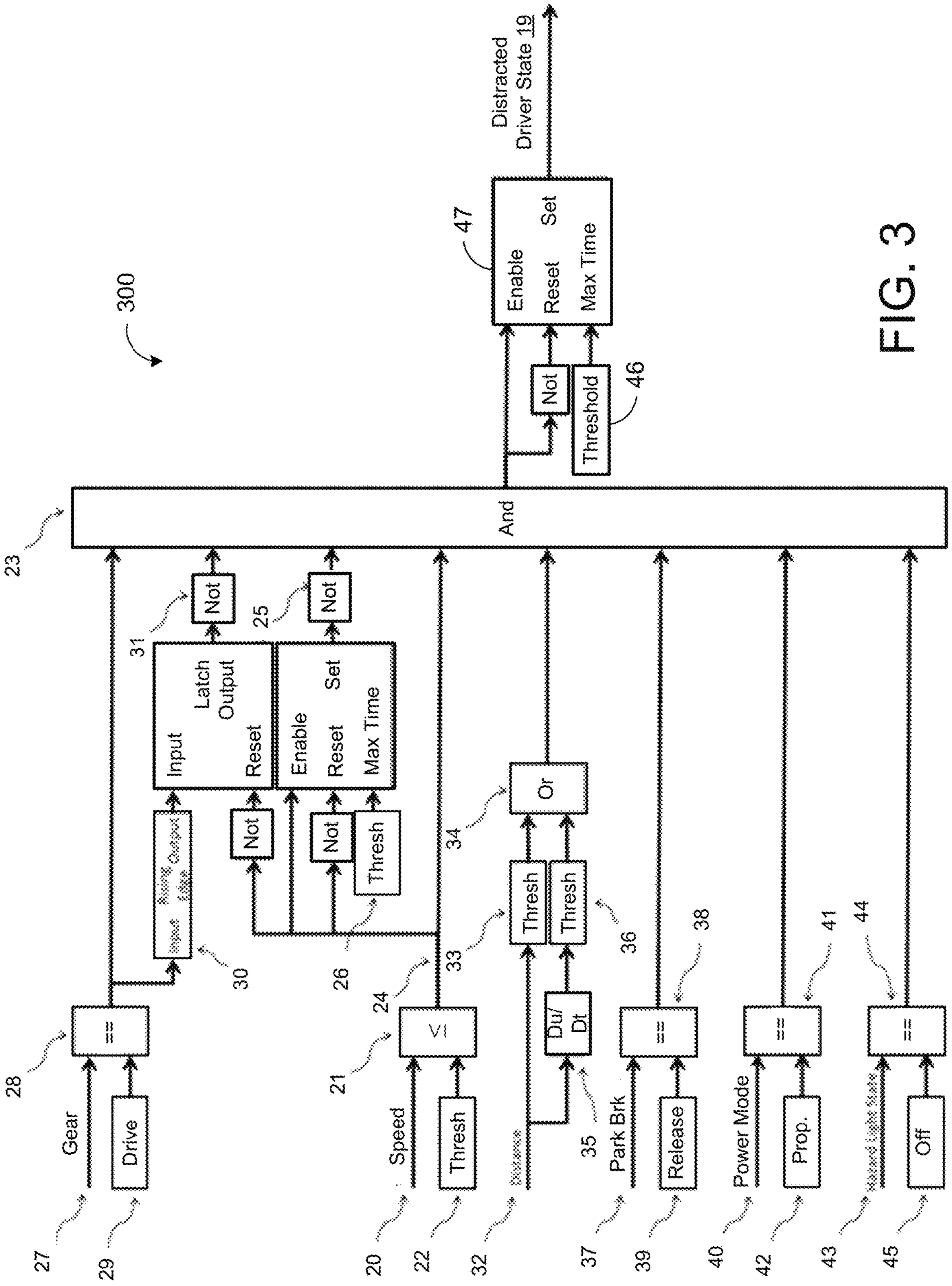
FIG. 3 is a schematic view of an example distracted driver detection algorithm.

FIG. 3 illustrates an example algorithm 300 executable by distracted driver detection and alert system 100. In particular, the example algorithm 300 may be deployed by the distracted driver detection module 250 using the vehicle data obtained by the sensors 122 and drive mode 124 of the vehicle 105. The distracted driver state 19 (i.e., distracted driver state 251 of FIG. 2) is determined based on the arbitration of the following conditions. One condition may be based on the vehicle speed 20 compared to a threshold 22 (standstill state) based on an operation 21. Another condition may depend on whether a Boolean condition 25 of the vehicle standstill state 24 satisfies a time threshold 26. Another condition may be based on the actuated gear 27 of the vehicle 105 compared 28 to the "Drive state" 29. A condition may be based on transition from "Park" gear to "Drive" gear 30 indicating that the vehicle has transitioned out of standstill 31. Another condition may be based on a Boolean operation 34 comparing whether a distance 32 with an object in front of the vehicle 105 satisfies a threshold 33 or whether a rate of the change of distance 35 satisfies a different threshold 36. Another condition may be based on a comparison 38 between the park brake state 37 to the state "Released" 39. Yet another condition may be based on a comparison 41 of the vehicle power mode 40 to the state "Propulsion" 42. Further, a condition may be based on a comparison 44 between the Hazard light state 43 to the state "Off" 45. In some implementations, each of the above conditions are combined in a Boolean "AND" operation 23 to determine an output. When the output of the Boolean "AND" operation 23 is satisfied for a time threshold 46, 47, the distracted driver state 19 may transition to "True."

The example algorithm 300 of FIG. 3 is not intended to be limiting. The distracted driver detection module 250 may implement any applicable algorithm to determine if the driver is distracted. In particular, the distracted driver detection module 250 can execute any distracted driver algorithm that uses any applicable vehicle data (e.g., any of the vehicle data described above with respect to sensors 122A-E and drive modes 124) to determine whether the vehicle 105 is disrupting a flow of stop and go traffic and whether the driver of the vehicle 105 is distracted from operating the vehicle 105.

Figure 4:
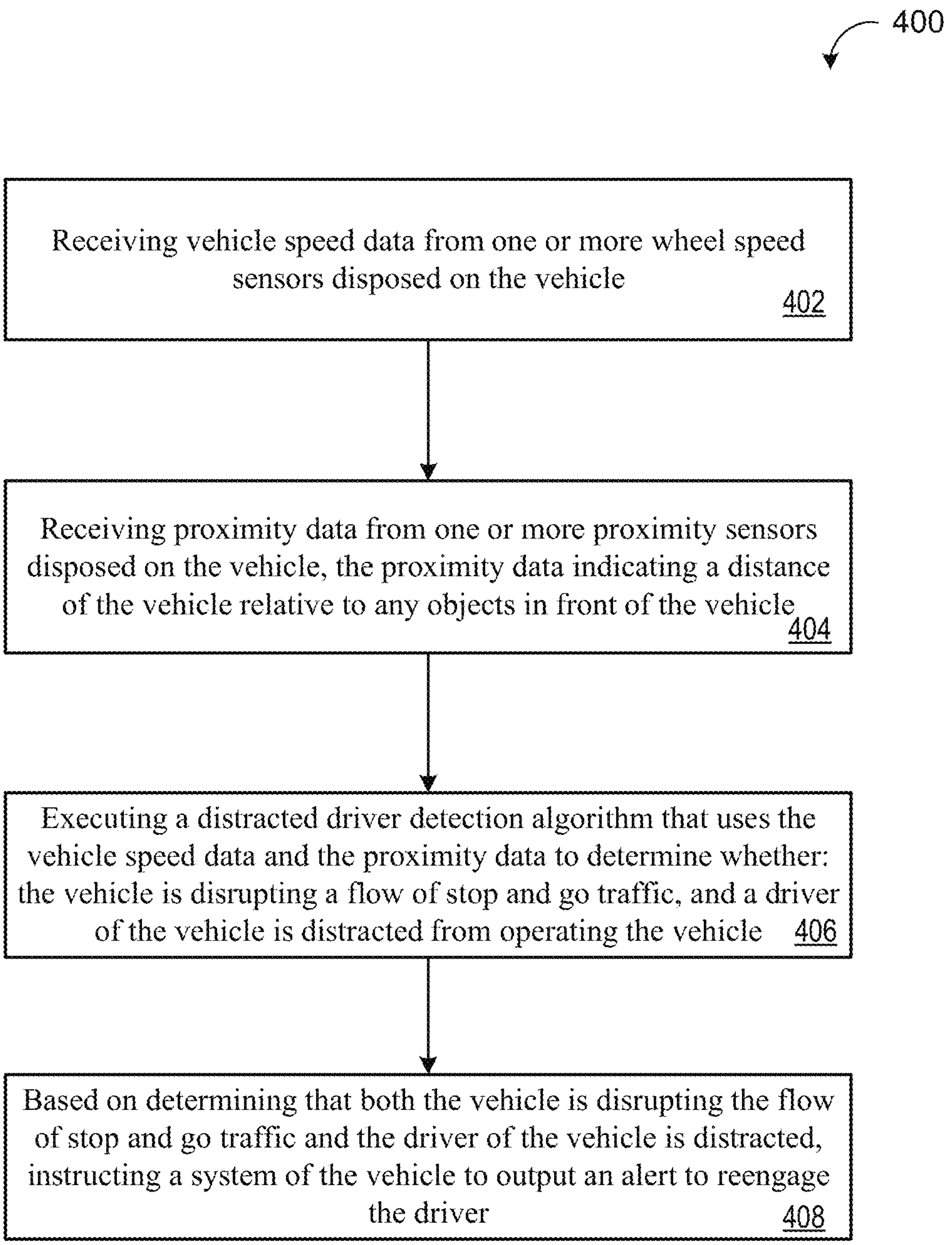
FIG. 4 a flowchart of an example arrangement of operations for a method of distracted driver detection and alert.

FIG. 4 is a flowchart of an exemplary arrangement of operations for a method 400 of distracted driver detection and alert. The method 400 may be performed, for example, on one or more processors of a computing device (such as data processing hardware 500 of FIG. 5) deployed in a vehicle (such as vehicle 105 of FIG. 1). At operation 402, the method 400 includes receiving vehicle speed data from one or more wheel speed sensors 112A disposed on the vehicle 105. At operation 404, the method 400 includes receiving proximity data from one or more proximity sensors 112B disposed on the vehicle 105, the proximity data indicating a distance of the vehicle 105 relative to any objects in front of the vehicle 105. At operation 406, the method 400 includes executing a distracted driver detection algorithm 300 that uses the vehicle speed data and the proximity data to determine that the vehicle 105 is disrupting a flow of stop and go traffic, and a driver of the vehicle is distracted from operating the vehicle 105. At operation 408, the method 400 includes, based on determining that both the vehicle 105 is disrupting the flow of stop and go traffic and the driver of the vehicle 105 is distracted, instructing a system 270 of the vehicle 105 to output an alert to reengage the driver.

Figure 5:
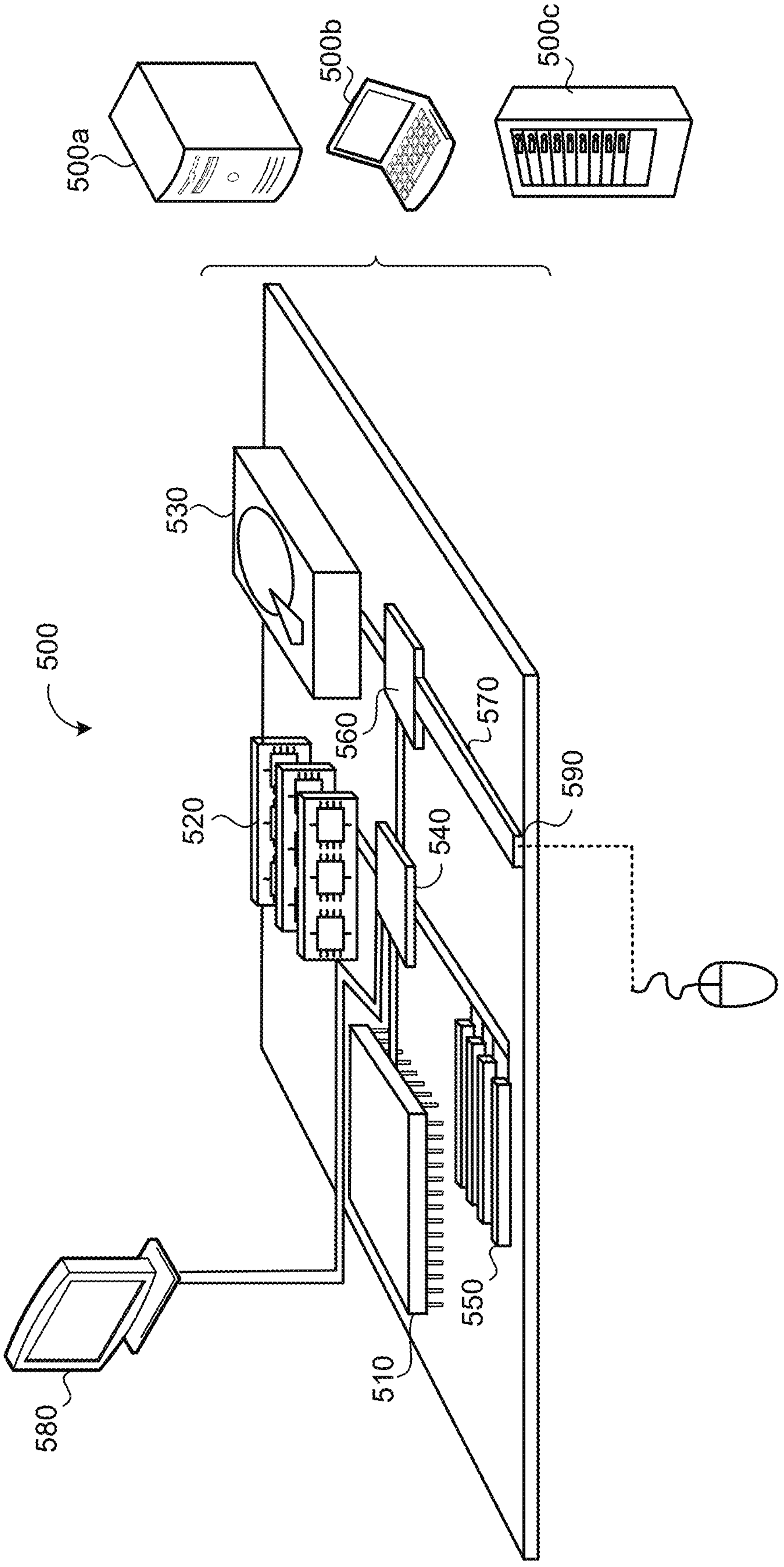
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
   - receiving vehicle speed data from one or more wheel speed sensors disposed on the vehicle;
   - receiving proximity data from one or more proximity sensors disposed on the vehicle, the proximity data indicating a distance of the vehicle relative to any objects in front of the vehicle;
   - executing a distracted driver detection algorithm that uses the vehicle speed data and the proximity data, and without using any data obtained from driver monitoring equipment and without using any data obtained from a camera, to determine both:
     - the vehicle is disrupting a flow of traffic; and
     - a driver of the vehicle is distracted from operating the vehicle; and
   - based on determining that both the vehicle is disrupting the flow of traffic and the driver of the vehicle is distracted, instructing a system of the vehicle to output an alert to reengage the driver.

2. The computer-implemented method of claim 1, wherein executing the distracted driver detection algorithm determines that both the vehicle is disrupting the flow of traffic and the driver of the vehicle is distracted without using any data obtained from advanced driver-assistance systems (ADAS) equipment.

3. The computer-implemented method of claim 1, wherein instructing the system of the vehicle to output the alert to reengage the driver comprises instructing an infotainment system of the vehicle to audibly output an audible alert from an acoustic speaker of the vehicle, the acoustic speaker in communication with the data processing hardware.

4. The computer-implemented method of claim 1, wherein instructing the system of the vehicle to output the alert to reengage the driver comprises instructing an infotainment system of the vehicle to visually output a graphical alert on a display screen of the vehicle, the display screen in communication with the data processing hardware.

5. The computer-implemented method of claim 1, wherein instructing the system of the vehicle to output the alert to reengage the driver comprises instructing one or more interior components of the vehicle to output a haptic alert.

6. The computer-implemented method of claim 1, wherein executing the distracted driver detection algorithm comprises:
   - determining the vehicle is disrupting the flow of traffic based on the vehicle speed data indicating that a speed of the vehicle is less than a threshold speed; and
   - determining the driver of the vehicle is distracted from operating the vehicle based on the proximity data indicating that:

the distance of the vehicle relative to a second vehicle in front of the vehicle is greater than a threshold distance; or a rate of change of the distance of the vehicle relative to the second vehicle in front of the vehicle is greater than a threshold rate of change.

7. The computer-implemented method of claim 1, wherein the operations further comprise:

receiving drive state data indicating that a drive gear of the vehicle is actuated, wherein executing the distracted driver detection algorithm to determine that both the vehicle is disrupting the flow of traffic and the driver of the vehicle is distracted is further based on the drive state data indicating that the drive gear of the vehicle is actuated.

8. The computer-implemented method of claim 1, wherein the operations further comprise:

receiving parking brake state data indicating that a parking brake of the vehicle is released, wherein executing the distracted driver detection algorithm to determine that both the vehicle is disrupting the flow of traffic and the driver of the vehicle is distracted is further based on the parking brake state data indicating that the parking brake of the vehicle is released.

9. The computer-implemented method of claim 1, wherein the operations further comprise:

receiving a hazard light state indication indicating that hazard lights of the vehicle are off, wherein executing the distracted driver detection algorithm to determine that both the vehicle is disrupting the flow of traffic and the driver of the vehicle is distracted is further based on the hazard light state indication indicating that hazard lights of the vehicle are off.

10. The computer-implemented method of claim 1, wherein the vehicle comprises a battery electric vehicle.

11. The computer-implemented method of claim 1, wherein the vehicle comprises a hybrid electric vehicle.

12. The computer-implemented method of claim 1, wherein the vehicle comprises an internal combustion engine.

13. The computer-implemented method of claim 1, wherein the data processing hardware resides on the vehicle.

14. A vehicle comprising:

data processing hardware; and memory hardware in communication with the data processing hardware and storing instructions that when executed on the data processing hardware causes the data processing hardware to perform operations comprising:

receiving vehicle speed data from one or more wheel speed sensors disposed on the vehicle;

receiving proximity data from one or more proximity sensors disposed on the vehicle, the proximity data indicating a distance of the vehicle relative to any objects in front of the vehicle;

executing a distracted driver detection algorithm that uses the vehicle speed data and the proximity data, and without using any data obtained from driver monitoring equipment and without using any data obtained from a camera, to determine both:

the vehicle is disrupting a flow of traffic; and a driver of the vehicle is distracted from operating the vehicle; and based on determining that both the vehicle is disrupting the flow of traffic and the driver of the vehicle is distracted, instructing a system of the vehicle to output an alert to reengage the driver.

15. The vehicle of claim 14, wherein executing the distracted driver detection algorithm determines that both the vehicle is disrupting the flow of traffic and the driver of the vehicle is distracted without using any data obtained from advanced driver-assistance systems (ADAS) equipment.

16. The vehicle of claim 14, wherein instructing the system of the vehicle to output the alert to reengage the driver comprises instructing an infotainment system of the vehicle to audibly output an audible alert from an acoustic speaker of the vehicle, the acoustic speaker in communication with the data processing hardware.

17. The vehicle of claim 14, wherein instructing the system of the vehicle to output the alert to reengage the driver comprises instructing an infotainment system of the vehicle to visually output a graphical alert on a display screen of the vehicle, the display screen in communication with the data processing hardware.

18. The vehicle of claim 14, wherein instructing the system of the vehicle to output the alert to reengage the driver comprises instructing one or more interior components of the vehicle to output a haptic alert.

19. The vehicle of claim 14, wherein executing the distracted driver detection algorithm comprises:

determining the vehicle is disrupting the flow of traffic based on the vehicle speed data indicating that a speed of the vehicle is less than a threshold speed; and determining the driver of the vehicle is distracted from operating the vehicle based on the proximity data indicating that:

the distance of the vehicle relative to a second vehicle in front of the vehicle is greater than a threshold distance; or a rate of change of the distance of the vehicle relative to the second vehicle in front of the vehicle is greater than a threshold rate of change.

20. The vehicle of claim 14, wherein the operations further comprise:

receiving drive state data indicating that a drive gear of the vehicle is actuated, wherein executing the distracted driver detection algorithm to determine that both the vehicle is disrupting the flow of traffic and the driver of the vehicle is distracted is further based on the drive state data indicating that the drive gear of the vehicle is actuated.

21. The vehicle of claim 14, wherein the operations further comprise:

receiving parking brake state data indicating that a parking brake of the vehicle is released, wherein executing the distracted driver detection algorithm to determine that both the vehicle is disrupting the flow of traffic and the driver of the vehicle is distracted is further based on the parking brake state data indicating that the parking brake of the vehicle is released.

22. The vehicle of claim 14, wherein the operations further comprise:

receiving a hazard light state indication indicating that hazard lights of the vehicle are off, wherein executing the distracted driver detection algorithm to determine that both the vehicle is disrupting the flow of traffic and the driver of the vehicle is distracted is further based on the hazard light state indication indicating that hazard lights of the vehicle are off.

23. The vehicle of claim 14, wherein the vehicle comprises a battery electric vehicle.

24. The vehicle of claim 14, wherein the vehicle comprises a hybrid electric vehicle.

25. The vehicle of claim 14, wherein the vehicle comprises an internal combustion engine.

* * * * *